United States Patent
Innocenti et al.

(10) Patent No.: US 8,178,742 B2
(45) Date of Patent: May 15, 2012

(54) METHOD FOR IN SITU RECLAMATION OF AN AREA CONTAMINATED BY ORGANIC COMPOUNDS

(75) Inventors: Ivan Innocenti, Rome (IT); Alessandro Nardella, Rome (IT); Guido Capotorti, Anguillara Sabazia (IT)

(73) Assignee: ENI S.p.A., Rome (IT)

( * ) Notice: Subject to any disclaimer, the term of this patent is extended or adjusted under 35 U.S.C. 154(b) by 266 days.

(21) Appl. No.: 12/473,458

(22) Filed: May 28, 2009

(65) Prior Publication Data

US 2009/0299123 A1    Dec. 3, 2009

(30) Foreign Application Priority Data

May 28, 2008    (IT) ............................... MI2008A0995

(51) Int. Cl.
*A62D 3/00*    (2007.01)
*A62D 3/30*    (2007.01)
*A62D 3/33*    (2007.01)
*A62D 3/38*    (2007.01)

(52) U.S. Cl. ........ 588/315; 588/300; 588/313; 588/320; 588/400; 588/405

(58) Field of Classification Search ....... 166/244.1–387; 588/1–20, 301–415
See application file for complete search history.

(56) References Cited

U.S. PATENT DOCUMENTS

| | | | |
|---|---|---|---|
| 5,741,427 A * | 4/1998 | Watts et al. | 210/747.8 |
| 7,268,273 B2 * | 9/2007 | Chaney et al. | 800/298 |
| 2007/0225192 A1 * | 9/2007 | Boulos et al. | 510/367 |

\* cited by examiner

*Primary Examiner* — Jerry Lorengo
*Assistant Examiner* — Jennifer Smith
(74) *Attorney, Agent, or Firm* — Oblon, Spivak, McClelland, Maier & Neustadt, L.L.P.

(57) ABSTRACT

Method for in situ reclamation of an area contaminated by organic compounds, comprising:
  introducing at least one chelating agent into said area;
  allowing said chelating agent to diffuse through said area;
  introducing at least one stabilizing agent;
  introducing an aqueous solution comprising at least one peroxide.

29 Claims, No Drawings

METHOD FOR IN SITU RECLAMATION OF AN AREA CONTAMINATED BY ORGANIC COMPOUNDS

The present invention relates to a method for in situ reclamation of an area contaminated by organic compounds.

More specifically, the present invention relates to a method for in situ reclamation of an area contaminated by organic compounds comprising the introduction, in said contaminated area, of at least one chelating agent and, subsequently, of at least one stabilizing agent and an aqueous solution of at least one peroxide.

Technologies of in situ treatment with the purpose of reclaiming areas contaminated by organic compounds are known in the art.

In situ chemical oxidation (ISCO) is known, for example, which is a technology for the reclamation of contaminated areas, in particular for the reclamation of contaminated land and/or underground water, which uses oxidizing agents, such as, for example, permanganate, persulfate, hydrogen peroxide, capable of transforming the contaminating organic compounds into less toxic compounds for the environment and/or to bring them to complete mineralization.

Normally, in situ chemical oxidation (ISCO) requires the feeding of oxidizing agents in an aqueous medium which can be effected through ducts or feeding wells. By following gravity attraction, once the oxidizing agents in aqueous solution have been introduced into the contaminated area, they become an integral part of the underground water. Through the underground water, the water solution of the oxidizing agents normally follows the course due to the natural or induced hydraulic gradient. The course of the aqueous solution of oxidizing agents, however, also depends on the different physical and chemical characteristics of the contaminated area. Variations in the course can be caused, for example, by different materials which form said areas, such as, for example, clay, sand, layers of gravel, fractured rock layers; or on the surface characteristics of the materials forming said area, which can be altered by the absorption of the organic compounds, such as, for example, organic material of natural soil and organic contaminants containing hydrophobic parts.

The consumption of the aqueous solution of oxidizing agents on the part of the materials forming the contaminated area, is normally higher than the consumption of said oxidizing agents on the part of the contaminating organic compounds.

In order to overcome the above drawbacks, large volumes of aqueous solutions of oxidizing agents are usually introduced into the contaminated area at high concentrations. The introduction of aqueous solutions of oxidizing agents at high concentrations, however, can cause problems relating to the control of the trend of the oxidation reactions and the production of heat which normally takes place during said reactions.

In situ chemical oxidation systems are known, which chemically oxidize the contaminating organic compounds transforming them into safe and less toxic compounds for the environment. One of these systems is the reaction known, from the name of the person who discovered it in 1894, as the Fenton reaction. In this reaction, the oxidizing agent, i.e. hydrogen peroxide, is reacted with a metallic salt to generate free radicals having a higher oxidation potential than that of hydrogen peroxide. The free radicals react with the contaminating organic compounds so as to completely decompose them to carbon dioxide and water, or convert them into soluble and biodegradable compounds in water. A disadvantage of this reaction, however, is the fact that, both the catalytic decomposition of hydrogen peroxide and the oxidation of the organic compounds, are both exothermic reactions. The high amount of heat deriving from this reaction can lead to the melting of the materials used in the construction of ducts or feeding wells or to the boiling of the underground water close to the feeding area of the hydrogen peroxide. Furthermore, the high reactivity of hydrogen peroxide can lead to a rapid and uncontrolled production of gaseous oxygen which can, in turn, cause the stripping of the volatile contaminating organic compounds which must be collected and suitably treated with the use of other technologies, for example, by means of soil vapour extraction ("SVE").

Numerous studies have been described in the art for in situ treatment of contaminating organic compounds through reactions similar to the above-mentioned Fenton reaction.

American patent U.S. Pat. No. 5,741,427, for example, describes a method for in situ treatment of an area including contaminating compounds comprising: (a) preparing a first aqueous solution comprising an effective amount of a ligand donor selected from at least one member of the group which consists of a mixture of phosphoric acid and monobasic potassium phosphate, a mixture of phosphoric acid, monobasic potassium phosphate and sulfuric acid; and mixtures thereof; (b) preparing a second aqueous solution comprising an effective amount of a metallic catalyst selected from at least one member of the group which consists of salts of Fe (II), salts of Fe (III), chelates of Fe (II), chelates of Fe (III), and mixtures thereof; (c) combining said first aqueous solution and said second aqueous solution, said second aqueous solution and said first aqueous solution being in a molar ratio ranging from 0.5 to 1.5:1; and (d) adding said combined solutions to said area containing contaminating compounds in the presence of an oxidizing agent in a sufficient amount for treating said contaminants.

American patent U.S. Pat. No. 5,967,230 describes a method for reclaiming a contaminated area comprising the steps of: introducing a first component inside the area containing underground water and soil contaminated with hydrocarbon compounds, the area being essentially chemically untreated before the introduction of said first component; allowing the first component to be diffused within the area; introducing a second component inside the area, said second component comprising an oxidizing agent capable of reacting with the first component so as to release a free radical; allowing the first component and the second component to react so as to release a free radical; allowing the free radical to react with the contaminating organic compounds so as to form neutral species for the environment. Said first component is preferably a metallic salt, more preferably iron sulfate. Said second component is preferably hydrogen peroxide.

American patent U.S. Pat. No. 6,843,618 describes a method for the decontamination of soil and underground water containing organic contaminants and iron compounds, which comprises the steps of: treating said soil and underground water with an effective amount of an alkaline aqueous solution having a pH of at least 7 and containing an alkaline buffering agent, a peroxide and a chelating agent soluble in water, for a time sufficient for allowing said chelating agent to chelate the iron compounds present in the soil and underground water; reacting the chelated iron with the peroxide in order to catalytically convert the peroxide to an oxidizing agent; and subsequently putting the contaminants present in the soil and underground water in contact with the oxidizing gent in order to oxidize the organic contaminants to compounds which are safe and non-toxic for the environment. Examples of peroxides which can be used for the purpose are: hydrogen peroxide, magnesium peroxide, calcium peroxide and sodium percarbonate. Examples of alkaline buffering agents which can be used for the purpose are: phosphates of alkaline metals, urea phosphates, and mixtures thereof. Examples of chelating agents which can be used for the purpose are: ethylene-diaminetetraacetic acid (EDTA), diethylenetriaminepentaacetic acid (DPTA), ethylenediamine-bis (o-hydroxyphenyl)acetic acid (EDDHA), and their salts, and mixtures thereof.

The methods described above, however, can have various disadvantages. In particular, in the case of contaminated areas containing high amounts of metals, more specifically high amounts of iron, the catalytic decomposition of the peroxide can be violently accelerated with a consequent uncontrolled increase in both the temperature and the peroxide consumption. Furthermore, the methods described above often require a control of the reaction pH which can be effected either by acidification of the area to be reclaimed, an operation which is not always easy to effect due to the buffering capacity of the area itself (in particular the soil), or by controlling the pH of the decontaminating solution.

The Applicant has now found that in situ reclamation of an area contaminated by organic compounds can be advantageously effected by means of a method which comprises the introduction into said contaminated area of at least one chelating agent and, subsequently, of at least one stabilizing agent and an aqueous solution of at least one peroxide. This method allows the lifetimes of the peroxide to be stabilized and/or prolonged, thus enabling its greater diffusion through the contaminated area and consequently a greater reclaiming capacity (i.e. a greater capacity of transforming the organic compounds into compounds which are safe and non-toxic for the environment). Furthermore, this method avoids the use of high amounts of aqueous solutions of peroxide at high concentrations and consequently allows the oxidation rate to be controlled avoiding violent reactions and an uncontrolled increase in the temperature. This method also avoids the stripping of the volatile contaminating organic compounds. This method, moreover, does not require a control of the reaction pH.

An object of the present invention therefore relates to a method for in situ reclamation of an area contaminated by organic compounds comprising:
  introducing at least one chelating agent into said area;
  allowing said chelating agent to diffuse through said area;
  introducing at least one stabilizing agent;
  introducing an aqueous solution comprising at least one peroxide.

For the purposes of the present invention and of the following claims, the term "contaminated area" refers to the following zones:
  the saturated zone which refers to the region of the profile of the soil which is constantly situated beneath the underground water;
  the unsaturated zone which refers to the region of the profile of the soil which is constantly situated above the underground water;
  the smear zone which refers to the region of the profile of the soil through which the level of underground water fluctuates, typically according to the seasons; said smear zone is the region which, when the underground water is at its maximum level, is considered a saturated zone and when the underground water is at its minimum level is considered an unsaturated zone;
  underground water.

For the purposes of the present description and of the following claims, the term "organic compounds" refers to organic compounds which are not naturally present in the contaminated area. Examples of these organic compounds are: aliphatic hydrocarbons such as, for example, gasoline, diesel oil, olefinic hydrocarbons, chlorinated or polychlorinated hydrocarbons, industrial solvents and dry-cleaning solvents, agents for the treatment of wood, herbicides, pesticides, polychlorinated biphenyls, aromatic or polycyclic aromatic hydrocarbons, oxygenated hydrocarbons, phenol and its derivatives, hydrocarbons containing nitro groups, or mixtures thereof.

For the purposes of the present description and of the following claims, the definitions of the numeric ranges always comprise the extremes unless otherwise specified.

According to a preferred embodiment of the present invention, the chelating agent can be selected, for example, from:
  (a) polyamino-polycarboxylic acids or their salts such as, for example, sodium salts, potassium salts, lithium salts, or ammonium salts, or mixtures thereof;
  (b) carboxylic acids or their salts such as, for example, sodium salts, potassium salts, lithium salts, or ammonium salts, or mixtures thereof;
  or mixtures thereof.

Specific examples of polyamino-polycarboxylic acids or their salts (a) which can be advantageously used for the purposes of the present invention are: nitrilotriacetic acid (NTA), ethylenediaminetetraacetic acid (EDTA), disodium salt of ethylenediaminetetraacetic acid ($Na_2$-EDTA), tetrasodium salt of ethylenediaminetetra-acetic acid ($Na_4$-EDTA), ammonium salt of ethylenediaminetetraacetic acid ($NH_4$-EDTA), ethyleneglycol-bis(aminoethylether)tetraacetic acid (EGTA), diethylenetriaminepentaacetic acid (DPTA), trisodium salt of diethylenetriaminepentaacetic acid ($Na_3$-DTPA), pentasodium salt of diethylenetriaminepentaacetic acid ($Na_5$-DTPA), triethylenetetraaminehexaacetic acid (TTHA), ethylene-diaminebis(o-hydroxyphenyl)acetic acid (EDDHA), N-hydroxyethylethylenediaminetetraacetic acid, trisodium salt of N-hydroxyethylethylenediaminetetraacetic acid, or mixtures thereof. Disodium salt of ethylenediaminetetra-acetic acid ($Na_2$-EDTA), trisodium salt of diethylenetriaminepentaacetic acid ($Na_3$-DTPA), or mixtures thereof, are preferred.

Specific examples of carboxylic acids or their salts (b) which can be advantageously used for the purposes of the present invention are: sodium oxalate, potassium oxalate, ammonium oxalate, lithium oxalate, citric acid, sodium citrate, malic acid, sodium malonate, phytic acid, sodium phytate, or mixtures thereof.

According to a preferred embodiment of the present invention, the stabilizing agent can be selected, for example, from alkaline metal phosphates, preferably sodium phosphates, potassium phosphates, lithium phosphates, or mixtures thereof, such as, for example, monobasic potassium phosphate ($KH_2PO_4$), dibasic potassium phosphate ($K_2HPO_4$), sodium tripolyphosphate ($Na_5P_3O_{10}$), sodium pyrophosphate ($Na_4P_2O_7$), sodium metaphosphate ($NaPO_3$)$_n$ wherein n is greater than 2, preferably 3 or 4, or mixtures thereof. Monobasic potassium phosphate ($KH_2PO_4$) is preferred.

According to a preferred embodiment of the present invention, the peroxide can be selected, for example, from hydrogen peroxide, magnesium peroxide, calcium peroxide, sodium percarbonate, or mixtures thereof. Hydrogen peroxide is preferred.

According to a preferred embodiment of the present invention, the aqueous solution containing at least one peroxide contains from 20% by weight to 60% by weight, preferably from 30% by weight to 50% by weight, of at least one peroxide.

According to a preferred embodiment of the present invention, the aqueous solution containing at least one peroxide is introduced into the contaminated area in such an amount that the concentration of peroxide reaches a concentration in the saturation water of said area (i.e. the water contained in the saturated zone as defined above) ranging from 1% by weight to 25% by weight, preferably from 5% by weight to 15% by weight, with respect to the total amount of said saturation water.

According to a preferred embodiment of the present invention, the chelating agent and the peroxide are used in a molar ratio ranging from $1:1\times 10^2$ to $1:1\times 10^5$, more preferably from $1:1\times 10^3$ to $1:1\times 10^4$.

According to a further embodiment of the present invention, the chelating agent is used in an amount ranging from 0.05 mmoles/kg to 10 mmoles/kg, preferably from 0.1 mmoles/kg to 2.0 mmoles/kg, of contaminated soil.

According to a preferred embodiment of the present invention, the stabilizing agent and the peroxide are used in a molar ratio ranging from 1:2 to 1:100, more preferably from 1:3 e 1:50.

According to a preferred embodiment of the present invention, the chelating agent is left to diffuse through the contaminated area for a time necessary for chelating at least one of the metals such as, for example, iron, manganese, copper, in particular, iron, present in said area. The chelating agent is preferably left to diffuse through the contaminated area for a time ranging from 6 hours to 48 hours, more preferably from 12 to 30 hours.

According to a preferred embodiment of the present invention, the aqueous solution of the peroxide is introduced simultaneously with the stabilizing agent.

According to a further embodiment of the present invention, the aqueous solution of the peroxide is introduced after the stabilizing agent. In this case, the aqueous solution of peroxide is preferably introduced after a time ranging from 1 hour to 35 hours, more preferably after a time ranging from 10 hours to 30 hours.

It should be noted that for the purpose of the present invention, both said chelating agent and said stabilizing agent can be optionally used in aqueous solution. The optional use of chelating agents and/or stabilizing agents in aqueous solution must take place, however, taking into account that the chelating agent/peroxide molar ratio, or, the amount of chelating agent (mmoles)/soil (kg), as well as the stabilizing agent/peroxide molar ratio, must be maintained within the above ranges.

The method according to the present invention can be carried out according to techniques known in the art. For example, the various reagents, i.e. the chelating agent, the stabilizing agent and the aqueous peroxide solution can be fed to a feeding duct or well, preferably to several feeding ducts or wells, in order to increase the probability of contact of the contaminating organic compounds with said reagents. These feeding ducts or wells can be made of or coated with materials resistant to corrosion such as, for example, stainless steel, polytetrafluoroethylene (PTFE), polyvinylchloride (PVC) or chlorinated polyvinylchloride (CPVC). Extraction ducts or wells are normally also present in the contaminated area, from which the contaminating organic compounds can be recovered after oxidation.

According to an embodiment of the present invention, the amount of the various reagents and the number of treatment cycles to which the contaminated area should be subjected, are predetermined. For this purpose, for example, a sample of contaminated area (for example, soil and/or underground water) is taken and the concentration of organic contaminants (for example, hydrocarbons) and the various components contained therein is determined by means of standard techniques (these standard techniques are better specified in the following examples). The results obtained are subsequently used for determining the amounts of the various reagents as well as the number of treatment cycles to which the contaminated area should be subjected. The contaminated area can in fact be subjected to a single treatment cycle according to the method of the present invention, or, to various treatment cycles, depending on the types of contaminating organic compounds contained therein. The number of treatment cycles is normally determined by monitoring the performances of the various reagents, in particular the peroxide, once they have been injected into said area.

Some practical embodiment examples of the method object of the present invention, are provided hereunder for purely illustrative and non-limiting purpose of the present invention.

EXAMPLES 1-2

20 g of soil coming from an area contaminated by hydrocarbons having the following characteristics:
  9000 mg/kg of iron and 250 mg/kg of manganese (determined according to the Standard EPA 3051A 1998 and EPA 6010C 2000 methods);
  2000 mg/kg of total organic carbon (determined according to the Standard UNI EN 13137:2000 method);
were divided into two 10 g aliquots and introduced into two 50 ml glass test-tubes.

An aqueous solution of hydrogen peroxide at 35% by weight was added to each test-tube in such an amount so as to obtain a concentration of 6% by weight (Example 1) and of 10% by weight (Example 2), in the saturation water of the soil itself.

After the addition of the aqueous solution of hydrogen peroxide, the test-tubes were stirred for a few seconds and left to rest for 4 hours.

The residual concentration of hydrogen peroxide present in the saturation water of the soil was subsequently measured by means of iodometric titration (titration with sodium thiosulfate in the presence of potassium iodide and sodium molybdate): said concentration proved to be equal to zero.

EXAMPLES 3-8

Samples of the soil used in Examples 1-2 described above, were used for evaluating the use of the chelating agents.

For this purpose, the samples (10 g) of soil were introduced into 50 ml glass test-tubes and an aqueous solution of hydrogen peroxide at 35% by weight was added to each test-tube in such an amount so as to obtain a concentration of 10% by weight (conc. %) in the saturation water of the soil itself and the following chelating agents:
  disodium salt of ethylenediaminetetraacetic acid ($Na_2$-EDTA);
  trisodium salt of diethylenetriaminepentaacetic acid ($Na_3$-DTPA).

The molar ratios of chelating agent/hydrogen peroxide (mol/mol $H_2O_2$) used are indicated in Table 1.

After the addition of the aqueous solution of hydrogen peroxide and of the chelating agent, the test-tubes were stirred for a few seconds and left to rest.

The residual concentration (res. conc. %) of hydrogen peroxide present in the saturation water of the soil was subsequently measured at different times (1 hour, 2 hours and 4 hours) by means of iodometric titration (titration with sodium thiosulfate in the presence of potassium iodide and sodium molybdate): the results obtained are indicated in Table 1.

TABLE 1

| Example | $H_2O_2$ (conc. %) | $Na_2$-EDTA (mol/mol $H_2O_2$) | $Na_3$-DTPA (mol/mol $H_2O_2$) | $H_2O_2$ (res. conc. %) 1 hr | 2 hrs | 4 hrs |
|---|---|---|---|---|---|---|
| 3 | 10 | — | — | 0.64 | 0.14 | 0 |
| 4 | 10 | 1/20 | — | 0 | — | — |
| 5 | 10 | 1/10 | — | 0 | — | — |
| 6 | 10 | 1/5 | — | 0 | — | — |
| 7 | 10 | $1/2.5 \times 10^3$ | — | 0.25 | 0 | — |
| 8 | 10 | — | $1/2.5 \times 10^3$ | 0.65 | 0.11 | 0 |

From the above reported data, it can be deduced that the use of the chelating agent does not influence or actually has a negative effect on the stabilization of the hydrogen peroxide.

In particular:

Examples 4-7 show an acceleration in the decomposition reaction of the hydrogen peroxide with respect to Example 3 (absence of chelating agent): after 1 hour, in fact, the concentration of hydrogen peroxide present in the saturation water of the soil is equal to 0 (Examples 4-6), or equal to 0.25 (Example 7);

Example 8 shows that there is no stabilizing effect: the concentration of hydrogen peroxide present in the saturation water of the soil is in fact substantially similar to that of Example 3 (absence of chelating agent).

EXAMPLES 9-16

Samples of the soil used in Examples 1-2 described above, were used for evaluating the use of the stabilizing agents.

For this purpose, the samples (10 g) of soil were introduced into 50 ml glass test-tubes and an aqueous solution of hydrogen peroxide at 35% by weight was added to each test-tube in such an amount so as to obtain a concentration of 6% by weight (conc. %) (Example 9) and 10% by weight (Example 10) in the saturation water of the soil itself and monobasic potassium phosphate ($KH_2PO_4$).

The molar ratios of stabilizing agent/hydrogen peroxide (mol/mol $H_2O_2$) used are indicated in Table 2.

After the addition of the aqueous solution of hydrogen peroxide and stabilizing agent, the test-tubes were stirred for a few seconds and left to rest.

The residual concentration (res. conc. %) of hydrogen peroxide present in the saturation water of the soil was subsequently measured at different times (1 hour, 2 hours, 4 hours, 16 hours and 24 hours) by means of iodometric titration (titration with sodium thiosulfate in the presence of potassium iodide and sodium molybdate): the results obtained are indicated in

TABLE 2

| Example | $H_2O_2$ (conc. %) | $KH_2PO_4$ (mol/mol $H_2O_2$) | $H_2O_2$ (res. conc. %) 1 hr | 2 hrs | 4 hrs | 16 hrs | 24 hrs |
|---|---|---|---|---|---|---|---|
| 9 | 6 | — | 0 | — | — | — | — |
| 10 | 10 | — | 0.64 | 0.14 | 0 | — | — |
| 11 | 6 | 1/20 | — | — | — | 1.0 | 0 |
| 12 | 6 | 1/10 | — | — | — | 1.0 | 0 |
| 13 | 6 | 1/5 | — | — | — | 0.9 | 0 |
| 14 | 10 | 1/20 | — | — | — | 1.9 | 0 |
| 15 | 10 | 1/10 | — | — | — | 2.0 | 0 |
| 16 | 10 | 1/5 | — | — | — | 1.6 | 0 |

From the above reported data it can be deduced that the stabilizing agent has a positive effect on the stabilization of hydrogen peroxide: after 16 hours, in fact, the hydrogen peroxide is still present in the saturation water of the soil.

The reduction in the hydrocarbons in the sample of soil treated according to Example 14 in accordance with the Standard EPA 3550B and the Standard 8015B was then also measured: the reduction with respect to the content of total initial hydrocarbons was equal to 73%.

EXAMPLES 17-19

Samples of the soil used in Examples 1-2 described above, were used for evaluating the method according to the present invention.

For this purpose, the samples (10 g) of soil were introduced into 50 ml glass test-tubes and the following chelating agents were added:

disodium salt of ethylenediaminetetraacetic acid ($Na_2$-EDTA);

trisodium salt of diethylenetriaminepentaacetic acid ($Na_3$-DTPA).

The molar ratios of chelating agent/hydrogen peroxide (mol/mol $H_2O_2$) used are indicated in Table 3.

After the addition of the chelating agent, the test-tubes were stirred for a few seconds and left to rest for 24 hours.

An aqueous solution of hydrogen peroxide at 35% by weight was subsequently added in such an amount so as to obtain a concentration of 10% by weight (conc. in the saturation water of the soil itself and monobasic potassium phosphate ($KH_2PO_4$): the molar ratios of stabilizing agent/hydrogen peroxide (mol/mol $H_2O_2$) used are indicated in Table 3.

After the addition of the aqueous solution of hydrogen peroxide and stabilizing agent, the test-tubes were stirred for a few seconds and left to rest.

The residual concentration (res. conc. %) of hydrogen peroxide present in the saturation water of the soil was subsequently measured at different times (16 hours, 24 hours and 48 hours) by means of iodometric titration (titration with sodium thiosulfate in the presence of potassium iodide and sodium molybdate): the results obtained are indicated in Table 3.

TABLE 3

| Example | $H_2O_2$ (conc. %) | $Na_2$-EDTA (mol/mol $H_2O_2$) | $Na_3$-DTPA (mol/mol $H_2O_2$) | ($KH_2PO_4$) (mol/mol $H_2O_2$) | $H_2O_2$ (res. conc. %) 16 hrs | 24 hrs | 48 hrs |
|---|---|---|---|---|---|---|---|
| 17 | 10 | — | 0 | — | — | — | — |
| 18 | 10 | $1/4.5 \times 10^3$ | — | 1/20 | 4.1 | 2.9 | 0.5 |
| 19 | 10 | — | $1/4.5 \times 10^3$ | 1/20 | 3.9 | 2.7 | 0.6 |

From the above reported data, it can be deduced that the method according to the present invention (Examples 18-19) stabilizes the hydrogen peroxide: after 48 hours in fact the hydrogen peroxide is still present in the saturation water of the soil.

The reduction of hydrocarbons in the sample of soil treated according to Examples 18 and 19 was then also measured according to the Standard EPA 3550B and the Standard EPA 8015B: the reduction with respect to the content of total initial hydrocarbons was equal to 80%. The greater stabilization of the hydrogen peroxide therefore allows a greater capacity of eliminating the contaminating organic compounds.

EXAMPLES 20-21

Samples of the soil used in Examples 1-2 described above, were used for evaluating the use of the method according to the present invention.

For this purpose, the samples (10 g) of soil were introduced into 50 ml glass test-tubes and the following chelating agents were added:
disodium salt of ethylenediaminetetraacetic acid ($Na_2$-EDTA);
trisodium salt of diethylenetriaminepentaacetic acid ($Na_3$-DTPA).

The molar ratios of chelating agent/hydrogen peroxide (mol/mol $H_2O_2$) used are indicated in Table 4.

After the addition of the chelating agent, the test-tubes were stirred for a few seconds and left to rest for 24 hours.

Monobasic potassium phosphate ($KH_2PO_4$) was subsequently added: the molar ratios of stabilizing agent/hydrogen peroxide (mol/mol $H_2O_2$) used are indicated in Table 4.

After the addition of monobasic potassium phosphate the test-tubes were stirred for a few seconds and left to rest for 24 hours.

An aqueous solution of hydrogen peroxide at 35% by weight was subsequently added in such an amount so as to obtain a concentration of 10% by weight (conc. %) in the saturation water of the soil itself.

After the addition of the aqueous solution of hydrogen peroxide and stabilizing agent, the test-tubes were stirred for a few seconds and left to rest.

The residual concentration (res. conc. %) of hydrogen peroxide present in the saturation water of the soil was subsequently measured after 48 hours by means of iodometric titration (titration with sodium thiosulfate in the presence of potassium iodide and sodium molybdate): the results obtained are indicated in Table 4.

TABLE 4

| Example | $H_2O_2$ (conc. %) | $Na_2$-EDTA (mol/mol $H_2O_2$) | $Na_3$-DTPA (mol/mol $H_2O_2$) | ($KH_2PO_4$) (mol/mol $H_2O_2$) | $H_2O_2$ (res. conc. %) 48 hrs |
|---|---|---|---|---|---|
| 20 | 10 | $1/4.5 \times 10^3$ | — | 1/20 | 0.2 |
| 21 | 10 | — | $1/4.5 \times 10^3$ | 1/20 | 0.5 |

From the above reported data, it can be deduced that the method according to the present invention (Examples 20-21) stabilizes the hydrogen peroxide: after 48 hours in fact the hydrogen peroxide is still present in the saturation water of the soil.

The reduction of hydrocarbons in the sample of soil treated according to Examples 20 and 21 was then also measured according to the Standard EPA 3550B and the Standard EPA 8015B: the reduction with respect to the content of total initial hydrocarbons was equal to 80%. The greater stabilization of the hydrogen peroxide therefore allows a greater capacity of eliminating the contaminating organic compounds.

The invention claimed is:
1. A method, comprising:
introducing at least one chelating agent in non-chelated form into a contaminated area comprising an organic compound and a metal;
diffusing said at least one chelating agent through said area for a time period of from 6 to 48 hours; and
subsequently introducing at least one stabilizing agent and an aqueous solution comprising at least one peroxide into said area, wherein
said chelating agent chelates to said metal present in said contaminated area during said diffusing.

2. The method according to claim 1, wherein the chelating agent is selected from the group consisting of a polyamino-polycarboxylic acid, a salt of a polyamino-polycarboxylic acid, a carboxylic acid, a salt of a carboxylic acid, and a mixture thereof.

3. The method according to claim 2, wherein the polyamino-polycarboxylic acid or salt thereof is selected from the group consisting of nitrilotriacetic acid, ethylenediaminetetraacetic acid, a disodium salt of ethylenediaminetetraacetic acid, a tetrasodium salt of ethylenediaminetetra-acetic acid, an ammonium salt of ethylene-diaminetetraacetic acid, ethylene glycol-bis(aminoethylether)tetraacetic acid, diethylenetriaminepentaacetic acid, a trisodium salt of diethylenetriaminepentaacetic acid, a pentasodium salt of diethylenetriaminepentaacetic acid, triethylene tetraaminehexaacetic acid, ethylene diamine-bis(o-hydroxyphenyl)acetic acid, N-hydroxyethylethylene diaminetetra-acetic acid, a trisodium salt of N-hydroxyethylethylene diaminetetraacetic acid, and a mixture thereof.

4. The method according to claim 3, wherein the polyamino-polycarboxylic acid or salt thereof is selected from the group consisting of a disodium salt of ethylenediaminetetraacetic acid, trisodium salt of diethylenetriaminepentaacetic acid, and a mixture thereof.

5. The method according to claim 2, wherein the carboxylic acid or salt thereof is selected from the group consisting of sodium oxalate, potassium oxalate, ammonium oxalate, lithium oxalate, citric acid, sodium citrate, malic acid, sodium malonate, phytic acid, sodium phytate, and a mixture thereof.

6. The method according to claim 1, wherein the stabilizing agent is an alkaline metal phosphate.

7. The method according to claim 6, wherein the stabilizing agent is selected from the group consisting of monobasic potassium phosphate, dibasic potassium phosphate, sodium tripolyphosphate, sodium pyrophosphate, sodium metaphosphate ($NaPO_3$)$_n$ wherein n is greater than 2 and a mixture thereof.

8. The method according to claim 7, wherein the stabilizing agent is monobasic potassium phosphate.

9. The method according to claim 1, wherein the peroxide is selected from the group consisting of hydrogen peroxide, magnesium peroxide, calcium peroxide, sodium percarbonate, and a mixture thereof.

10. The method according to claim 9, wherein the peroxide is hydrogen peroxide.

11. The method according to claim 1, wherein said aqueous solution comprises from 20% by weight to 60% by weight of said at least one peroxide.

12. The method according to claim 11, wherein said aqueous solution comprises from 30% by weight to 50% by weight of said at least one peroxide.

13. The method according to claim 1, wherein said aqueous solution is introduced into the contaminated area in such an amount that the concentration of peroxide reaches a concentration in a saturation water of said area ranging from 1% by weight to 25% by weight with respect to the total amount of said saturation water.

14. The method according to claim 13, wherein the concentration of peroxide in the saturation water of said area ranges from 5% by weight to 15% by weight with respect to the total amount of said saturation water.

15. The method according to claim 1, wherein the chelating agent and peroxide are present in a molar ratio ranging from $1:1\times10^2$ to $1:1\times10^5$.

16. The method according to claim 15, wherein the chelating agent and peroxide are present in a molar ratio ranging from $1:1\times10^3$ to $1:1\times10^4$.

17. The method according to claim 1, wherein the contaminated area is soil and the chelating agent is present in an amount ranging from 0.05 mmoles/kg to 10 mmoles/kg of soil.

18. The method according to claim from 17, wherein the contaminated area is soil and the chelating agent is present in an amount ranging from 0.1 mmoles/kg to 2.0 mmoles/kg of soil.

19. The method according to claim 1, wherein the stabilizing agent and peroxide are present in a molar ratio ranging from 1:2 to 1:100.

20. The method according to claim 19, wherein the stabilizing agent and peroxide are present in a molar ratio ranging from 1:3 to 1:50.

21. The method according to claim 1, wherein said diffusing is carried out for a time ranging from 12 to 30 hours.

22. The method according to claim 1, wherein said introducing at least one stabilizing agent is carried out simultaneously with said introducing an aqueous solution.

23. The method according to claim 1, wherein said introducing at least one stabilizing agent is carried out before said introducing an aqueous solution.

24. The method according to claim 23, wherein said aqueous solution is introduced into said contaminated area from 1 to 35 hours after said introducing at least one stabilizing agent.

25. The method according to claim 24, wherein said aqueous solution is introduced into said contaminated area from 10 to 30 hours after said introducing at least one stabilizing agent.

26. The method according to claim 1, wherein the chelating agent is at least one of:
 (a) a sodium salt, a potassium salt, a lithium salt, or an ammonium salt of a polyamino-polycarboxylic acid; and
 (b) a sodium salt, a potassium salt, a lithium salt, or an ammonium salt of a carboxylic acid.

27. The method according to claim 1, wherein the stabilizing agent is at least one member selected from the group consisting of a sodium phosphate, a potassium phosphate, and a lithium phosphate.

28. The method according to claim 1, wherein said contaminated area is soil.

29. The method according to claim 1, wherein said metal comprises at least one member selected from the group consisting of iron, manganese, and copper.

* * * * *